United States Patent [19]

Vaz et al.

[11] Patent Number: 5,211,876

[45] Date of Patent: May 18, 1993

[54] POLYMER DISPERSED LIQUID CRYSTAL MATERIAL HAVING AN EXTENDED WAVE-LENGTH RESPONSE

[75] Inventors: Nuno A. Vaz, West Bloomfield; Thomas H. Van Steenkiste, Washington; George W. Smith, Birmingham; George P. Montgomery, Jr., Troy, all of Mich.

[73] Assignee: General Motors Corporation, Detroit, Mich.

[21] Appl. No.: 546,290

[22] Filed: Jun. 29, 1990

[51] Int. Cl.⁵ ............... C09K 19/52; C09K 19/00; F21V 9/00; G02F 1/13
[52] U.S. Cl. .................................. 252/299.01
[58] Field of Search .............. 252/299.1, 582, 587; 359/51, 42, 245; 385/130; 428/1

[56] References Cited

U.S. PATENT DOCUMENTS

| | | | |
|---|---|---|---|
| 4,673,255 | 6/1987 | West et al. | 359/51 |
| 4,685,771 | 8/1987 | West et al. | 359/51 |
| 4,728,547 | 3/1988 | Vaz et al. | 252/299.66 |
| 4,938,568 | 7/1990 | Margenum et al. | 359/51 |
| 4,944,576 | 7/1990 | Lacker et al. | 350/51 |

*Primary Examiner*—Robert L. Stoll
*Assistant Examiner*—Shean C. Wu
*Attorney, Agent, or Firm*—Domenica N. Hartman

[57] ABSTRACT

Liquid crystal films are potentially useful for automotive displays and for automotive windows and sunroofs with variable optical transmission. The present invention provides a liquid crystal material having an extended wavelength response and a method for making the same. The size of the liquid crystal microdroplets within the material are controlled such that a polydisperse liquid crystal film is formed. Controlling the curing parameters during the cure of a supersaturated mixture of liquid crystal in polymer precursor allows for the fabrication of a polymer-dispersed liquid crystal material containing a multimodal distribution of microdroplet sizes which provides a film acting as both as a visible light shutter and a strong scattered of infrared radiation.

12 Claims, 2 Drawing Sheets

POLYMER DISPERSED LIQUID CRYSTAL MATERIAL HAVING AN EXTENDED WAVE-LENGTH RESPONSE

TECHNICAL FIELD

The present invention generally relates to a thin film liquid crystal material, and more specifically relates to optically responsive thin films of cured polymers incorporating a dispersion of microdroplets of liquid crystal materials.

BACKGROUND OF THE INVENTION

Liquid crystal devices and materials have been finding new applications, such as electro-optically active windows, sunroofs and information displays. Thin films containing microdroplets of liquid crystal material dispersed within polymers are capable of switching between a light scattering or opaque state and a clear transparent state when responding to applied electric fields. Traditional applications for this technology include electro-optical devices, information displays and other electronic devices. In the fabrication of these information displays and electronic devices, the visible light wavelengths were traditionally the wavelengths of concern.

For other applications, including windows and sunroofs in automotive applications, it would be especially advantageous to have a liquid crystal film which would not only scatter visible light to act as a light shutter, but one which would also scatter near-infrared solar radiation so the film may also act as a solar heat load attenuator. It would also be advantageous to fabricate architectural windows including a film capable of not only scattering light, but also of scattering infrared solar radiation.

Still in other applications, including projection systems of visual information, it may be desirable to reduce excessive light intensity at light wavelengths longer than about 555 nanometers, which is the wavelength at which the human eye is typically most sensitive, because light with wavelengths longer than 555 nanometers may have undesirable heating effects or it may wash out the crispness of the image being projected.

In the past, it has been shown that liquid crystal materials can be mixed with certain liquid polymer precursors, cast into a film, and phase separated by curing to form microdroplets of liquid crystal in situ from a homogeneous solution of the liquid crystal and the polymer. The polymer material which is formed by curing functions as a support medium for the microdroplets of liquid crystal material contained therein.

The microdroplets of liquid crystal material dispersed in the polymeric supporting matrix act as light scattering particles which, when in the "off" state, scatter light, making the film substantially opaque. When the film is in its "on" state, it is transparent and allows light through the film. This ability to act as a light shutter lends the liquid crystal material to many applications for giving selective darkness or opaqueness to glass or plastic enclosures, whether its application is automotive, commercial or electronic. Depending upon the nature of the liquid crystal material and the temperature or voltage of the film, the film may be opaque or transparent at room temperature. When the film has a voltage applied or is heated, the film may change from opaque to transparent or from transparent to opaque depending upon the construction of the device.

It has been determined previously that in order to optimize the light scattering qualities, the films should contain a maximum amount of liquid crystal droplets. In addition, the amount of liquid crystal within the droplets should also be maximized as opposed to remaining dissolved in the matrix. Previous attempts have been made to maximize the amount of liquid crystalline material entrapped in the droplets. The liquid crystalline films were applied onto an electrode-coated substrate. The electrode coatings may be indium-tin-oxide or fluorine-tin-oxide or other transparent conducting electrode materials for applying the required electrical voltage. In the final product, the liquid crystal film is sandwiched between two substrates coated with the electrode material, with the electrodes in electrical communication with the liquid crystal film.

Prior art patents have disclosed means and methods for first dissolving liquid crystals into an uncured polymer, and then curing the mixture to cause the liquid crystals to phase separate into microdroplets for scattering of light. A single phase solution is a miscible mixture of liquid crystal and polymer. Upon phase separation, the materials separate into two discrete phases, i.e., a liquid-crystal-rich phase, and a polymer-rich phase. Phase separation has been achieved in the past by (1) cooling a resin heated above the transition temperature, thereby causing dissolution and precipitation of the liquid crystals, (2) curing the unpolymerized or uncured resin containing liquid crystals, and (3) evaporating solvents from a solvent-polymer-liquid crystal system. A particular method may be selected for an individual material due to its distinctive physical characteristics.

Previously described and disclosed materials for liquid crystal films included a single droplet size distribution peaked about a single characteristic value. Several prior art patents, including U.S. Pat. No. 4,673,255 issued to West et al, U.S. Pat. No. 4,685,771 issued to West et al, and U.S. Pat. No. 4,435,047 issued to Fergason, disclose materials and methods for making the same which include uniformly sized droplets. The methods for achieving uniformly sized droplets have included sorting, sieving and other methods.

A polymer dispersed liquid crystal system is said to be polydisperse if it possesses a multimodal or sufficiently broad distribution of microdroplet sizes as defined in terms of either radius or volume. A multimodal distribution is a distribution which is bimodal, trimodal or of a greater order modality. Thus, a polymer dispersed liquid crystal film simultaneously containing microdroplets with local maxima centered at one micrometer and five micrometers is said to have bimodal polydispersity with mean diameters of one and five micrometers respectively. Likewise, a polymer-dispersed liquid crystal film simultaneously containing microdroplets with local maxima centered at one, three and ten micrometers is said to have trimodal polydispersity with mean diameters of one, three and ten micrometers respectively. In general, the modes of a population are the values of the variate for which the relative frequency attains a local maximum. Prior art polymer-dispersed liquid crystal materials have had only one such maximum. A film having such properties would be said to be unimodal.

Accordingly, it is an object of the present invention to provide a polydisperse liquid crystal material including a multimodal distribution of liquid crystalline microdroplets having at least two local maxima in the distribution of droplet diameters.

In addition, a very high order modality distribution of droplet sizes may appear to be a broad distribution if the mean diameters of the individual modes of the distribution are very numerous and closely spaced relative to each other. In such a distribution it may be difficult to distinguish between the individual peaks or maxima characterizing the various modes, but the distribution may still function as an essentially polydisperse distribution provided that the width of the distribution is sufficiently large. Such a broad distribution may be conveniently characterized by a spread parameter which, if larger than about $\frac{2}{3}$ (i.e., 0.66), causes the distribution to function essentially as a polydisperse distribution and, if smaller than $\frac{2}{3}$, causes the distribution to function as an essentially monodisperse distribution.

Accordingly, it is another object of the present invention to provide a polydisperse liquid crystal material including a broad distribution of liquid crystal microdroplets having a spread parameter at least 0.66.

Lastly, it is another object of the present invention to provide a method for conveniently and economically forming a polymer-dispersed liquid crystalline material having a multimodal droplet size distribution with local maxima at two or more droplet diameter sizes.

SUMMARY OF THE INVENTION

In accordance with a preferred embodiment of the invention, these and other objects and advantages are accomplished as follows. An optically responsive film made of a polymer-dispersed liquid crystal material capable of scattering light and infrared radiation includes liquid crystal microdroplets having a polydisperse droplet size distribution with at least two local maxima in the droplet diameter size distribution. The liquid crystal material includes liquid-crystalline microdroplets having a multimodal distribution of droplet sizes. Disclosed are various polymeric materials including liquid crystal material entrapped therein having substantially discrete mean radii to be responsive to various wavelengths of radiation, lambda1 through lambdan.

In one embodiment of the present invention, the liquid crystal material includes polydisperse liquid crystalline microdroplets responsive to an extended range of wavelengths from lambda1 to lambdan. The liquid crystal material has a first series of droplets with a mean diameter from about lambda1/3 to about lambda1$\frac{1}{2}$ micrometers, where lambda1 is is about 0.5 to 2 micrometers, and at least a second series of droplets with a mean diameter from about lambdan/3 to about lambdan/2 micrometers, where lambdan is about 2 to 15 micrometers. The first droplet series comprises at least about 10 percent of the total droplet volume fraction of the liquid crystal material, while the second droplet series also comprises at least about 10 percent of the total droplet volume fraction of the liquid crystal material.

In another embodiment of the present invention, the liquid crystal material may include such a plurality of modes of microdroplet sizes that it may resemble a broad distribution but, nonetheless, it may still function essentially as a polydisperse distribution which may be described by a spread parameter S described by the following formula:

$$S = (Dmax - Dmin)/(Dmax + Dmin)$$

in which the liquid crystal material has a droplet size distribution having a minimum droplet diameter Dmin and a maximum droplet Dmax, such that about 10 percent of the total droplet volume fraction has droplet diameters smaller than Dmin and about 10 percent of the total droplet volume fraction has droplet diameters larger than Dmax. The spread parameter will be a number between 0 and 1. Liquid crystal films described in the prior art have had spread parameter values of less than $\frac{2}{3}$, while materials described in the present invention have spread parameter values greater than $\frac{2}{3}$.

In still another embodiment of the present invention, the liquid crystal material may include a polydisperse distribution of liquid crystalline microdroplets having a first series of droplets with diameters equal to or less than about 1 micrometer, wherein the first droplet series makes up at least about 10 percent of the total droplet volume fraction of the liquid crystal material, while also including a second series of droplets with diameters equal to or greater than about 2 micrometers. The second droplet series comprises at least about 10 percent of the total droplet volume fraction of the liquid crystal material.

Further disclosed is a method for producing an optically responsive film containing liquid crystal microdroplets dispersed in a polymeric film. The method is carried out by dissolving a super saturating amount of liquid crystal material into a polymer precursor mixture by vigorously mixing a ratio of from about 0.01:1 to about 5:1, depending on the choice of materials, of a liquid crystal material into a polymer precursor mixture. During the vigorous mixing, the liquid crystal material-polymer precursor mixture is maintained at a sufficiently elevated temperature of from about −20° C. to about 200° C., depending on the choice of materials, to keep the excess liquid crystal material dissolved in the polymer precursor mixture. Thereafter, the liquid crystal-polymer precursor mixture is applied as a thin film onto a substrate.

The liquid crystal-polymer precursor mixture is then adequately cured at the same or lower temperature to initiate phase separation between the liquid crystal material and the polymer being formed but not cured sufficiently to cause full phase separation. After either a waiting period of just a few seconds to 15 minutes or a change in the cure temperature of 15° to 100° C. after a waiting period of just a few seconds to 15 minutes, the cure of the polymer is resumed and carried to completion. By curing in this manner liquid crystalline microdroplets having a distribution of at least two different, substantially discrete mean diameter sizes are formed in the polymeric film.

There are several methods for curing the liquid crystal material described hereinabove. Curing of the liquid crystal-polymer precursor mixture may be accomplished by thermal means or with irradiation. Irradiating with ultraviolet radiation is especially advantageous due to the ease of controlling the curing parameters. The mixture is prepared as described above at the sufficiently high temperature and applied onto a substrate. When curing is effected by irradiating the liquid crystal-polymer mixture with ultraviolet radiation at that temperature or a lower temperature, a power level of at least 10 milliwatts per square centimeter is utilized for a sufficient time to begin phase separation. Either the temperature is changed and/or the irradiation is interrupted before full phase separation occurs, thereby forming liquid crystalline microdroplets having a distribution of at least two different, substantially discrete mean diameter sizes within the polymer matrix, one of the ranges of droplet sizes being formed essentially before the change in temperature or the interruption of irradiation, the other range being formed essentially after the change in temperature or the interruption of irradiation.

When curing is effected by changing the temperature, the cure temperature may be changed by 15° to 100° C. from that at which the materials were mixed together or that at which the cure was initiated after an appropriate delay time of just a few seconds to 15 minutes, thereby forming liquid crystal microdroplets having a size distribution of at least two different, substantially discrete mean diameters distributed throughout the polymer matrix.

BRIEF DESCRIPTION OF THE DRAWINGS

Other objects, features and advantages of the present invention will become apparent upon consideration of the specification and the appendant drawings, in which.

DETAILED DESCRIPTION OF THE DRAWINGS

Figure 1:
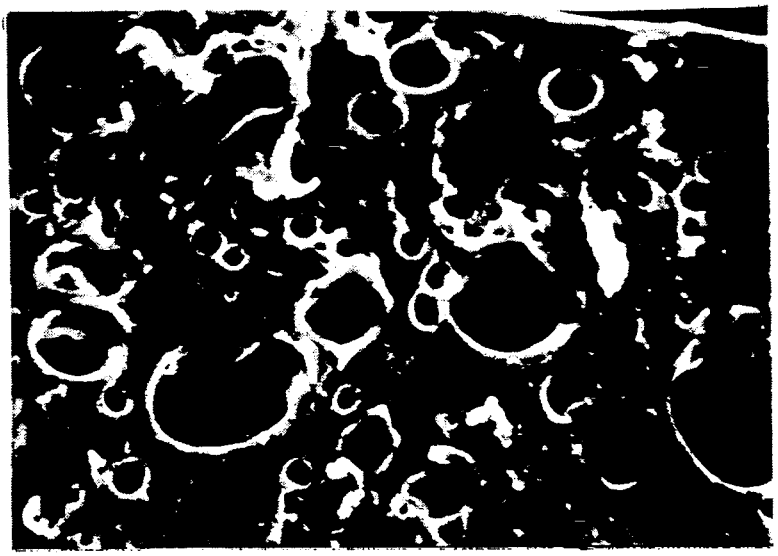
FIG. 1 is an SEM photomicrograph of a cross-sectional view of a thermally cured liquid crystal system in which liquid crystal microdroplets having a trimodal size distribution are dispersed in a polymer matrix.

Referring initially to FIG. 1, an SEM photomicrograph taken at about 1000 X magnification of a cross-section through a polymer-dispersed liquid crystal film is shown. As can be seen from FIG. 1, the microdroplet distribution is trimodal as there are basically three discrete microdroplet mean diameter sizes with the medium size being most prevalent. These microdroplet sizes are designed to scatter varying wavelengths of radiation. In prior art systems having a fixed radius of droplet size, the scattering of input radiation decreases with increasing wavelength. For example, for a 0.44 micrometer droplet, the scattering in the near infrared at a wavelength of one micrometer is only 20 percent of the scattering which occurs in the visible wavelength region of 0.5 micrometers. Disclosed is a material which exhibits increased scattering and reduced off-state transmittance of near infrared wavelengths by creating a plurality of droplet sizes in the polymer matrix of the material. In order to simultaneously scatter the radiation of the visible wavelength as well as the near infrared wavelength, the present invention provides a film which includes various microdroplet sizes to scatter each of the incident wavelengths. Especially in the application of sunroof and automotive windows, the wavelength distribution of light scattering is very important.

The material illustrated in FIG. 1 is a thermally cured epoxy material having a trimodal droplet size distribution. The epoxy material utilized was a thermoset two-part epoxy commercially available from Devcon Corporation under the tradenames of Devcon 5; Devcon 5A and Devcon 5B being the first and second parts, respectively, of the two-part epoxy system.

The liquid crystal material utilized was a cyanobiphenyl derivative liquid crystal purchased from EM Industries of Hawthorne, New York. The material is designated by EM Industries as their 7CB liquid crystal.

The sample illustrated in FIG. 1 comprises 30 percent by volume Devcon 5A, 30 percent by volume Devcon 5B and 40 percent by volume of 7CB mixed together at a temperature of about 80° C. In this example, the temperature was rapidly reduced to about 30° C. just after mixing the components and just after the cure started. It produced a trimodal polydisperse system having microdroplet diameters of three, six and nine micrometers respectively. In referring to FIG. 1, there can be seen the three substantially distinct and discrete microdroplet sizes. When the same experiment was carried out with a mixing and curing temperature of about 80° C., a unimodal monodispersive film was formed which had microdroplets having a diameter of about 0.9 micrometers because at this temperature the mixture is no longer saturated with liquid crystal. In other words, at about 80° C., all of the liquid crystal that was used is easily dissolved in the polymer precursors. In another experiment, where we slowly decreased the temperature from 80° C. to 30° C. during the early stages of the cure, that is, during the first 5 to 15 minutes from the start of the cure, we obtained a polydisperse distribution with a droplet-size distribution and optical properties which are similar to those of the film prepared when the cure was all effected at the temperature of 30° c.

Figure 2:
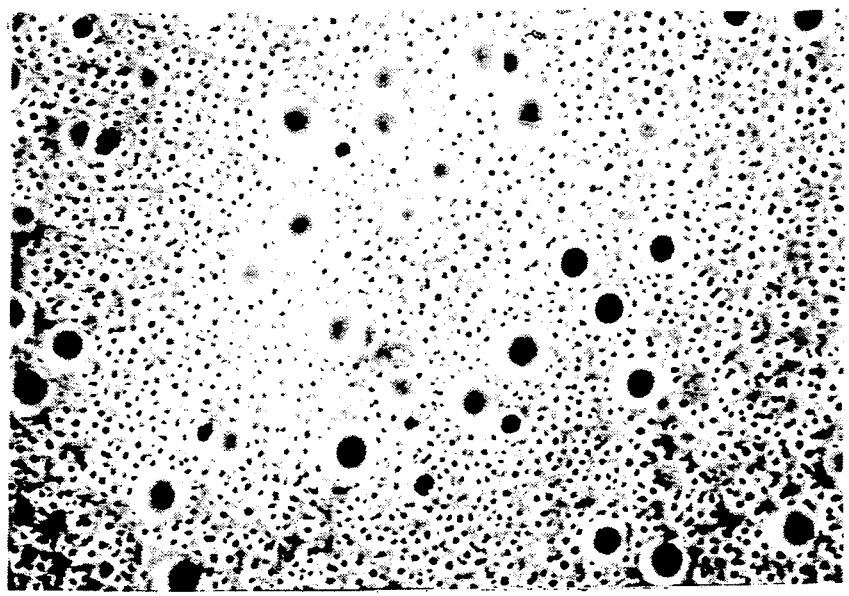
FIG. 2 is an SEM photomicrograph of a cross-sectional view of a liquid crystal system in which liquid crystal microdroplets having a bimodal size distribution are dispersed in a polymer matrix.

Referring now to FIG. 2, an SEM photomicrograph taken at about 300 X magnification of a cross-section through a bimodal polydisperse liquid crystal material formed in accordance with the present invention is shown. The polymer precursor material is a polyol system comprised of 30 percent by weight polyol, 22 percent by weight isocyanate, and 48 percent by weight of a liquid crystal mixture, wherein the polyol is a 1:1 mixture of TP440 polyoxypropylene having the formula:

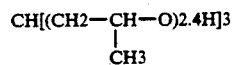

and TP410 polyoxypropylene with formula:

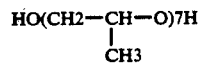

and with about 0.05 percent by weight of a catalyst, dibutyl tin dilaurate. The isocyanate component is 4-4'-dicycloheylmethane-diisocyanate while the liquid crystal material is commercially available as ROTN404 from Hoffmann-La Roche of Nutley, New Jersey. The materials were vigorously mixed together, and then placed and cured between two glass plates which had been previously coated with transparent conductive electrode material. The material was cured at 103° C. and formed a bimodal polydisperse liquid crystal material in which the microdroplet size distribution had a first local maximum at diameter of about three micrometers, and a second local maximum at diameter of about 15 micrometers. A similar experiment was done with different amounts of the identical components, without including an excess amount of the liquid crystalline mixture. Again, the liquid crystal material was cured at about 103° C., but a unimodal monodispersive liquid crystal material was produced having microdroplets with a local maxima about a mean diameter value of about three micrometers. Finally, in another experiment, we used the original 48% volume concentration of liquid crystal but, by having cured at the temperature of about 130° C., we obtained a monodisperse sample.

Figure 3:
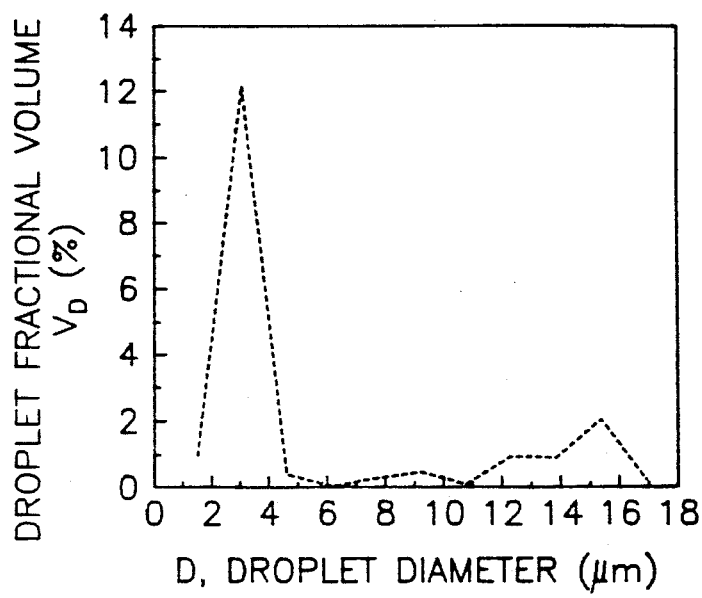
FIG. 3 is a graph showing droplet diameter sizes versus droplet fractional volume of the liquid crystal system shown in FIG. 2 formed in accordance with the present invention.

With combined reference to FIGS. 2 and 3, the sample material shown in FIG. 2 is described more fully in FIG. 3 as a graph of the droplet diameter versus the droplet fractional volume. As discussed above, example 2 produced a bimodal polydisperse system having microdroplet diameters of about 3.0 and 15.0 micrometers respectively. In the graph of FIG. 3, the microdroplet diameters are shown.

Figure 4:
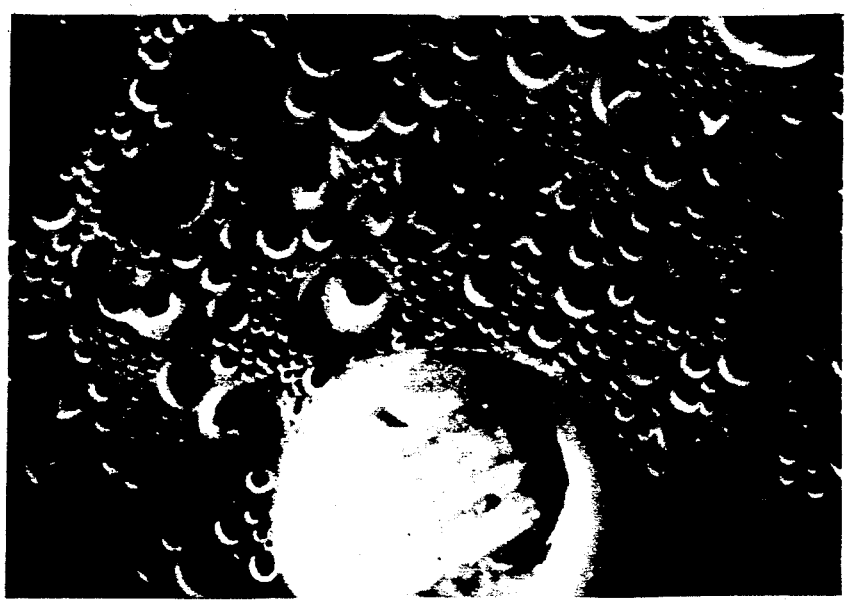
FIG. 4 is an SEM photomicrograph of a cross-sectional view of a UV-cured liquid crystal system in which liquid crystal microdroplets having a trimodal size distribution are dispersed in a polymer matrix.

A third example as illustrated in FIG. 4 by an SEM photomicrograph taken at about 2000 X magnification, shows an ultraviolet curable system which included 40 percent by weight of NOA65A and 60 percent by weight of EK11650 at a cure temperature of about 63° C., wherein NOA65A is an optical adhesive material commercially available from Norland Products, Inc. of New Brunswick, New Jersey, and EK11650 is a liquid crystal benzoyl acid, 2-chloro-4-((4-pentylbenzoyl)oxy)-4-pentyl ester, commercially available from Eastman Kodak Company of Rochester, New York. The liquid crystal material and the polymer precursor were vigorously mixed together at about 80° C. to obtain a homogeneous mixture, and then placed and cured between two glass plates which had been previously coated with transparent conductive electrode material. The curing conditions include irradiating the sample material at 85 milliwatts per square centimeter at a curing temperature of about 63° C. It is not necessary to irradiate the film at this power level. Power levels much lower than this, such as 10 milliwatts per square centimeter, are adequate so long as the material is adequately cured. Under these conditions, a liquid crystal material was formed having a trimodal polydispersity of microdroplet sizes centered about three local maxima having droplet diameter sizes of about 0.44, 1.81 and 2.50 micrometers, respectively.

Upon curing this sample at an even lower temperature of about 43° C. instead of 63° C., we obtained a monodisperse sample. Further, when we also decreased the UV-light intensity to about one-half its initial value, we again obtained a monodisperse sample.

In this trimodal example, the light wavelengths which are most effectively scattered range from lambda1 approximately equal to 1 micrometer to lambdan approximately equal to 7 micrometers. To those skilled in the art it should be apparent that, had we intended to scatter light at different wavelengths, we would have had to prepare a liquid crystal film with different, appropriate droplet sizes by, for example, varying the polymer cure conditions and/or the relative concentrations of the starting materials.

In the examples we have provided we have characterized the various droplet size-distributions in terms of the diameters of one, two or more local maxima which are substantially different and discrete in a graph of the droplet fractional volume. Alternatively, we may characterize those distributions in terms of the spread parameter which was described previously. In Table 1 we light the values of Dmax, Dmin, and S (the spread parameter) for those same samples.

TABLE 1

| DIAMETER (μm) | 1st EXAMPLE | | 2nd EXAMPLE | | 3rd EXAMPLE POLYDISPERSE |
|---|---|---|---|---|---|
| | MONO-DISPERSE | POLY-DISPERSE | MONO-DISPERSE | POLY-DISPERSE | |
| Dmax | 1.266 | 15.072 | 6.480 | 15.854 | 2.878 |
| Dmin | 0.579 | 1.700 | 2.135 | 2.434 | 0.334 |
| SPREAD PARAMETER S | 0.372 | 0.797 | 0.504 | 0.734 | 0.687 |

A method for producing an optically responsive film is also disclosed which may be performed by dissolving an excess amount of a liquid crystal material into a polymer precursor mixture to form a supersaturated mixture by vigorously mixing a ratio of from about 0.01:1 to about 5:1 of a liquid crystal material in a polymer precursor mixture. During the mixing, the temperature is slightly elevated to keep the excess amount of liquid crystal material dissolved in the polymer precursor and may be done at a temperature of from about −20° C. to about 200° C. Thereafter, the liquid crystal-polymer precursor mixture is applied as a thin film onto a substrate which had been previously coated with transparent conductive electrode material and cured. During the cure, the temperature may be changed by 15° to 100° C. after a delay time of zero to 15 minutes, or the intensity of the UV-irradiation may be temporarily decreased or even reduced to zero for about 2 seconds to 5 minutes, before the cure is complete. In this way, liquid crystalline microdroplets having a distribution with at least two different, substantially discrete mean diameter sizes are formed within the polymer matrix. For the radiation-cured polymer systems, by merely initiating the cure with ultraviolet radiation, some of the liquid crystal will form into one set of microdroplets as a result of the condensation of the supersaturation of the liquid crystal in the mixture. Continuing the irradiation after a delay time or a change in the light intensity before fully curing the polymer causes the formation of additional liquid crystal droplets. These will have a different characteristic diameter because they are formed under different conditions, namely, they are formed from a solution of liquid crystal in polymer which is no longer supersaturated. Depending on the degree of super-saturation and other external factors such as the temperature, the resulting microdroplet size-distribution will be unimodal, bimodal, or multimodal. Moreover, for radiation cured polymer systems, changing the temperature of cure or the intensity of the UV-irradiation may change the cure rate which, in turn, affects the droplet size. This UV-irradiation method is disclosed in U.S. Pat. No. 4,728,547 issued Mar. 1, 1988, to Vaz et al. When curing by ultraviolet radiation, controlling the parameters is relatively easy by starting and stopping the irradiation.

As one of ordinary skill in the art can imagine, the power levels which are necessary to initiate phase separation are material specific. Therefore, specific curing parameters must be chosen for individual polymer precursor components.

Similar methods of interrupting or disturbing the cure process may be applied to polymer systems which cure thermally, such as the usual epoxides, polyurethanes, and other systems. However, in these cases, changing the temperature has two combined effects: it changes the rate of the cure process and, therefore, the droplet size-distribution, and it also changes the relative solubility of the liquid crystal in the polymer, thereby changing the degree of its supersaturation. On the other hand, for the radiation cured polymer systems, changing the intensity of the UV-irradiation only affects the rate of cure. Depending on the materials and on the specific application, one may prefer the UV-cured systems or the thermally cured systems.

While our invention has been described in terms of a specific embodiment, it will be appreciated that other embodiments could readily be adapted by one skilled in the art. Accordingly, the scope of our invention is to be considered limited only by the following claims.

The embodiments of the invention in which an exclusive property or privilege is claimed are defined as follows:

1. An optically responsive film, comprising:
   a thin film of polymer dispersed liquid crystal material capable of scattering light and infrared radiation, said film being responsive to an applied voltage for switching between a light scattering off-state and a substantially clear, transparent on-state;
   wherein said liquid crystal material includes a polydisperse distribution of liquid crystalline microdroplet sizes having a first series of droplets with diameters equal to or less than about five micrometers, said first droplet series being at least about 10 percent of the total droplet volume fraction of the liquid crystal material; and
   said liquid crystal material furthermore having a second series of droplets with diameters equal to or greater than about 10 micrometers, said second droplet series being at least about 10 percent of the total droplet volume fraction of the liquid crystal material, said first and second droplet series being substantially uniformly dispersed throughout said liquid crystal material.

2. An optically responsive film, comprising:
   a thin film of polymer dispersed liquid crystal material capable of scattering light and infrared radiation, said film being responsive to an applied voltage for switching between a light scattering off-state and a substantially clear, transparent on-state;
   wherein said liquid crystal material includes a polydisperse distribution of liquid crystalline microdroplet sizes having a first series of droplets with diameters equal to or less than about three micrometers, said first droplet series being at least about 10 percent of the total droplet volume fraction of the liquid crystal material; and
   said liquid crystal material furthermore having a second series of droplets with diameters equal to or less than bout five micrometers, said second droplet series being at least about 10 percent of the total droplet volume fraction of the liquid crystal material, said first and second droplet series being substantially uniformly dispersed throughout said liquid crystal material.

3. An optically responsive film as recited in claims 2 wherein said first series of droplets have a diameter of about one micrometer and said second series of droplets have a diameter of about two micrometers.

4. An optically responsive film, comprising:
   a thin film of polymer dispersed liquid crystal material capable of scattering light and infrared radiation, the film also being responsive to an applied voltage for switching between a light scattering off state and a substantially clear, transparent on state;
   wherein said liquid crystal material has a substantially uniform droplet size distribution characterized by a minimum droplet diameter size Dmin and a maximum droplet diameter size Dmax, such that about 10 percent of the total droplet volume fraction has a droplet diameter size smaller than Dmin and about 10 percent of the total droplet volume fraction has a droplet diameter size larger than Dmax; and
   wherein the totality of the droplets have a spread parameter S described by $S = (Dmax - Dmin)/(Dmax + Dmin)$, said spread parameter S being greater than about 0.66.

5. An optically responsive film comprising a thin film of polymer dispersed liquid crystal material capable of scattering light and infrared radiation, said film being responsive to an applied voltage for switching between a light scattering off state and a substantially clear, transparent on state, wherein said liquid crystal material includes liquid crystalline microdroplets having a substantially uniform multimodal distribution of droplet sizes with local maxima centered about at least two means diameters.

6. The film of claim 5, wherein said liquid crystal material includes liquid crystals dispersed within epoxy material and said liquid crystal material having a trimodal distribution of droplet sizes with local maxima centered about mean diameters of about three, six and nine micrometers.

7. The film of claim 5, wherein said liquid crystal material includes liquid crystals dispersed within polyol material and said liquid crystal material having a bimodal distribution of liquid crystal microdroplet sizes with local maxima centered about mean diameters of about three and 15 micrometers.

8. The film of claim 5, wherein said liquid crystal material includes liquid crystals dispersed within ultraviolet-radiation-curable polymeric materials, and said liquid crystal material having a trimodal distribution of liquid crystal microdroplet sizes with local maxima centered about mean diameters of bout 0.5, 1.8 and 2.5 micrometers.

9. An optically responsive film comprising a thin film of polymer dispersed liquid crystal material capable of scattering light and infrared radiation having varying wavelengths from lambda1 to lambdan, said film being responsive to an applied voltage for switching between a light scattering off state and a substantially clear, transparent on state, wherein said liquid crystal material includes polydisperse liquid crystalline microdroplets having a first series of droplets with a mean diameter from about lambda1/3 to about lamba½ micrometers, where labda1 is about 0.5 to 2 micrometers, said first droplet series being at least about 10 percent of the total droplet volume fraction of the liquid crystal material, and said liquid crystal material furthermore having a least one more series of droplets with at least one more mean diameter from about lambdan/3 to about lambdan/2 micrometers, where lambdan is about 2 to about 15 micrometers; said second droplet series being at least about 01 percent of the total droplet volume fraction of the liquid crystal material, said first and second droplet series being substantially uniformly dispersed throughout said liquid crystal material.

10. A method for producing an optically responsive film containing liquid crystal microdroplets which are substantially uniformly dispersed in a polymeric film, the method comprising the steps of:
(1) dissolving a liquid crystal material into a polymer precursor to form a substantially homogeneous mixture by vigorously mixing a ratio of from about 0.01:1 to about 5:1 of said liquid crystal material in said polymer precursor at a first temperature of about −20° C. to about 200° C. such that said liquid crystal material is substantially dissolved in said polymer precursor to form said mixture;
(2) applying said mixture as a thin film onto a substrate;
(3) partially curing said mixture at said first temperature to initiate phase separation between said liquid crystal material and said polymer precursor but not curing sufficiently to cause full phase separation, whereby liquid crystalline microdroplets having a first range of microdroplet sizes are formed; and
(4) after a delay period of about 5 seconds to about 15 minutes curing is resumed at a second temperature which is about 10° C. to about 100° C. less than said first temperature, thereby causing the formation of a second or more ranges of liquid crystal microdroplet sizes, such that in the resulting material the liquid crystal is characterized by microdroplets with a substantially uniform size distribution of at lest two different, substantially discrete mean diameters within the polymeric film or is characterized by a spread parameter of at least about 0.66.

11. A method for producing an optically responsive film containing liquid crystal microdroplets which are substantially uniformly dispersed in a polymeric film, the method comprising the steps of:
(1) dissolving a liquid crystal material into a polymer precursor to form a substantially homogeneous mixture by vigorously mixing a ratio of from about 0.01:1 to about 5:1 of said liquid crystal material in said polymer precursor at a first temperature of about −20° C. to about 120° C. such that said liquid crystal material is substantially dissolved in said polymer precursor to form said mixture;
(2) applying said mixture as a thin film onto a substrate;
(3) partially curing said mixture by irradiating with ultraviolet radiation at a power level of at least 10 mW/cm$^2$ for a sufficient time to initiate phase separation between said liquid crystal material and said polymer precursor, but not curing sufficiently to cause full phase separation, whereby liquid crystalline microdroplets having a first range of microdroplet sizes are formed; and
(4) after a delay period of about 5 seconds to about 15 minutes curing is resumed and completed by ultraviolet radiation, thereby causing the formation of a second or more ranges of liquid crystal microdroplet sizes, such that in the resulting material the liquid crystal is characterized by microdroplets with a substantially uniform size distribution of at least two different, substantially discrete mean diameters within the polymeric film.

12. A method for producing an optically responsive film containing liquid crystal microdroplets dispersed in a polymeric film as recited in claim 11 wherein said partially curing step is accomplished by irradiating with ultraviolet radiation at a power level of about 85 mW/cm$^2$.

* * * * *